United States Patent
Miller

(10) Patent No.: US 9,777,610 B2
(45) Date of Patent: Oct. 3, 2017

(54) NH3 FLOW MEASUREMENT

(71) Applicant: International Engine Intellectual Property Company, LLC, Lisle, IL (US)

(72) Inventor: Michael James Miller, Mt. Prospect, IL (US)

(73) Assignee: International Engine Intellectual Property Company, LLC., Lisle, IL (US)

( * ) Notice: Subject to any disclaimer, the term of this patent is extended or adjusted under 35 U.S.C. 154(b) by 13 days.

(21) Appl. No.: 14/786,899

(22) PCT Filed: Apr. 25, 2013

(86) PCT No.: PCT/US2013/038107
§ 371 (c)(1),
(2) Date: Oct. 23, 2015

(87) PCT Pub. No.: WO2014/175885
PCT Pub. Date: Oct. 30, 2014

(65) Prior Publication Data
US 2016/0076422 A1    Mar. 17, 2016

(51) Int. Cl.
*F01N 3/00* (2006.01)
*F01N 3/10* (2006.01)
(Continued)

(52) U.S. Cl.
CPC ........... *F01N 3/208* (2013.01); *F01N 3/2066* (2013.01); *F01N 11/00* (2013.01); *F01N 2550/14* (2013.01); *F01N 2610/02* (2013.01); *F01N 2610/06* (2013.01); *F01N 2900/0422* (2013.01); *F01N 2900/0601* (2013.01);
(Continued)

(58) Field of Classification Search
CPC ............ F01N 2610/02; F01N 2610/06; F01N 2900/0422; F01N 2900/0601; F01N 2900/1812; F01N 11/00; F01N 3/208; F01N 3/2066; Y02T 10/47; Y02T 10/24
See application file for complete search history.

(56) References Cited

U.S. PATENT DOCUMENTS 5,367,875 A * 11/1994 Aboujaoude ...... B01D 53/9472
123/526
5,809,775 A * 9/1998 Tarabulski ............. B01D 53/90
423/212

(Continued)

*Primary Examiner* — Phutthiwat Wongwian
*Assistant Examiner* — Diem Tran
(74) *Attorney, Agent, or Firm* — Jack D. Nimz; Jeffrey P. Calfa

(57) ABSTRACT

A flow manifold system for injecting a first gas into a second gas, such as, for example, a system for injecting ammonia gas into the exhaust gas of an internal combustion engine. The first gas may be supplied to the system by one or more cartridges. The system may also include a control valve that is configured to control the delivery of the first gas to the least one critical flow orifice. The critical flow orifice is configured to allow for a relatively constant volumetric flow of the first gas through the critical flow orifice when the first gas attains a critical flow. Such critical flow may allow for an accurate estimation of the flow of the first gas through the critical orifice, and subsequently to the second gas, without the use of a flow sensor.

7 Claims, 2 Drawing Sheets

(51) Int. Cl.
*F01N 3/20* (2006.01)
*F01N 11/00* (2006.01)

(52) U.S. Cl.
CPC ....... *F01N 2900/1812* (2013.01); *Y02T 10/24* (2013.01); *Y02T 10/47* (2013.01)

(56) References Cited

U.S. PATENT DOCUMENTS

2010/0086467 A1* 4/2010 Johansen ................ C01C 1/006
423/352
2012/0000183 A1 1/2012 Adelman

* cited by examiner

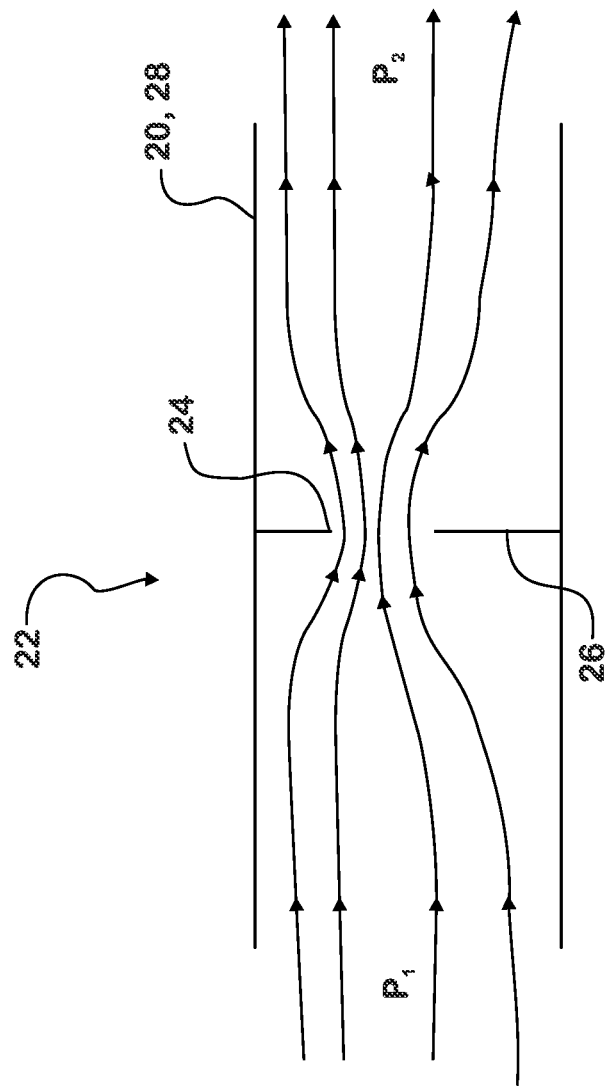

NH3 FLOW MEASUREMENT

BACKGROUND

Compression ignition engines provide advantages in fuel economy, but produce both nitrogen oxides ($NO_x$) and particulates during normal operation. New and existing regulations continually challenge manufacturers to achieve good fuel economy and reduce the particulates and $NO_x$ in the exhaust gas of the engine. Lean-burn engines may achieve the fuel economy objective, but the high concentrations of oxygen in the exhaust of these engines yield relatively high concentrations of $NO_x$. Accordingly, vehicles having compression engines may include after-treatment systems that attempt to reduce and/or eliminate $NO_x$ that is present in the exhaust gas.

One aspect of controlling such emissions by an after-treatment system includes injecting ammonia ($NH_3$) into an exhaust gas that is generated by the combustion of a fossil fuel, such as, for example, diesel fuel, petroleum, and gasoline. The $NH_3$ may be injected into the exhaust gas in dosing amounts or rates for converting $NO_x$ in the exhaust gas into at least nitrogen, such as, for example, through a catalytic reaction in an selective catalytic reduction (SCR) system. $NH_3$ used by the after-treatment system in the conversion of $NO_x$ may be stored in, and supplied from, a cartridge.

The release and/or amount of $NH_3$ delivered from the cartridge for injection into the exhaust gas may be controlled and/or monitored by an engine control unit or module (ECU). Such monitoring may be useful in estimating the amount of $NH_3$ that has injected into the $NO_x$ for purposes of estimating the amount of $NO_x$ that has been converted into at least nitrogen. Additionally, such monitoring may provide information relating to the amount of $NH_3$ that has been depleted from, or is remaining in, the cartridge. Typically, the quantity of $NH_3$ injected into the exhaust gas is monitored, such as, for example, through the use of flow sensors that provide information to the ECU. However, flow sensors are relatively expensive, and require additional associated components or equipment, and incur installation expenses. Further, the ECU may require programming that allows the ECU to interpret and/or apply the information received from the flow sensor. Additionally, flow sensors may have durability and accuracy issues, particularly relating to the effects the harsh operating environment of an after-treatment system may have on the flow sensors.

SUMMARY

Certain embodiments of the present technology provide a flow manifold system for injecting a first gas into a second gas. The flow manifold system includes at least one supply cartridge configured to store the first gas. The flow manifold system also includes at least one control valve configured to receive a flow of the first gas from the at least one supply cartridge. The at least one control valve is configured to control the delivery of the first gas to the at least one critical flow orifice. The at least one critical flow orifice is configured to allow for a relatively constant volumetric flow of the first gas through the at least one critical flow orifice when the first gas attains a critical flow. The flow manifold system also includes an engine control unit that is configured to estimate the quantity of the first gas supplied to the second gas based on the duration of time that the at least one control valve allows the first gas to flow to the at least one critical flow orifice.

Additionally, certain embodiments of the present technology provide an exhaust gas after-treatment system for injecting an ammonia gas into an exhaust gas of an engine for the treatment of nitrogen oxides. The after-treatment system includes at least one supply cartridge configured to store the ammonia gas. The after-treatment system also includes at least one control valve configured to receive a flow of the ammonia gas from the at least one supply cartridge. The at least one control valve is configured to control the flow of ammonia gas to a critical flow orifice. The critical flow orifice is configured to allow for a relatively constant volumetric flow of the ammonia gas to be injected into the exhaust gas when the ammonia gas flowing through the critical flow orifice attains a critical flow. The after-treatment system also includes a selective catalytic reduction system configured for a catalytic reaction using at least the ammonia gas injected into the exhaust gas to convert nitrogen oxides in the exhaust gas into at least nitrogen.

Additionally, certain embodiments of the present technology provide an exhaust gas after-treatment system for injecting an ammonia gas into an exhaust gas of an engine for the treatment of nitrogen oxides that includes a supply cartridge configured to store the ammonia gas. The exhaust gas after-treatment system also includes a first control valve configured to receive at least a portion of a flow of the ammonia gas from the supply cartridge. The first control valve is configured to control the flow of ammonia gas to a first critical flow orifice. The first critical flow orifice is configured to allow for a relatively constant volumetric flow of the ammonia gas to be injected into the exhaust gas when the ammonia gas flowing through the first critical flow orifice attains a first critical flow. The exhaust gas after-treatment system further includes an engine control unit configured to estimate the quantity of the ammonia gas supplied to the exhaust gas based on the duration of time that the first valve allows the ammonia gas to flow to the first critical flow orifice. Additionally, the estimation of the ammonia gas supplied to the exhaust gas is not based on information provided by a flow sensor.

BRIEF DESCRIPTION OF THE DRAWINGS

FIG. 2 illustrates a critical flow apparatus having a critical flow orifice.

DETAILED DESCRIPTION

Figure 1:
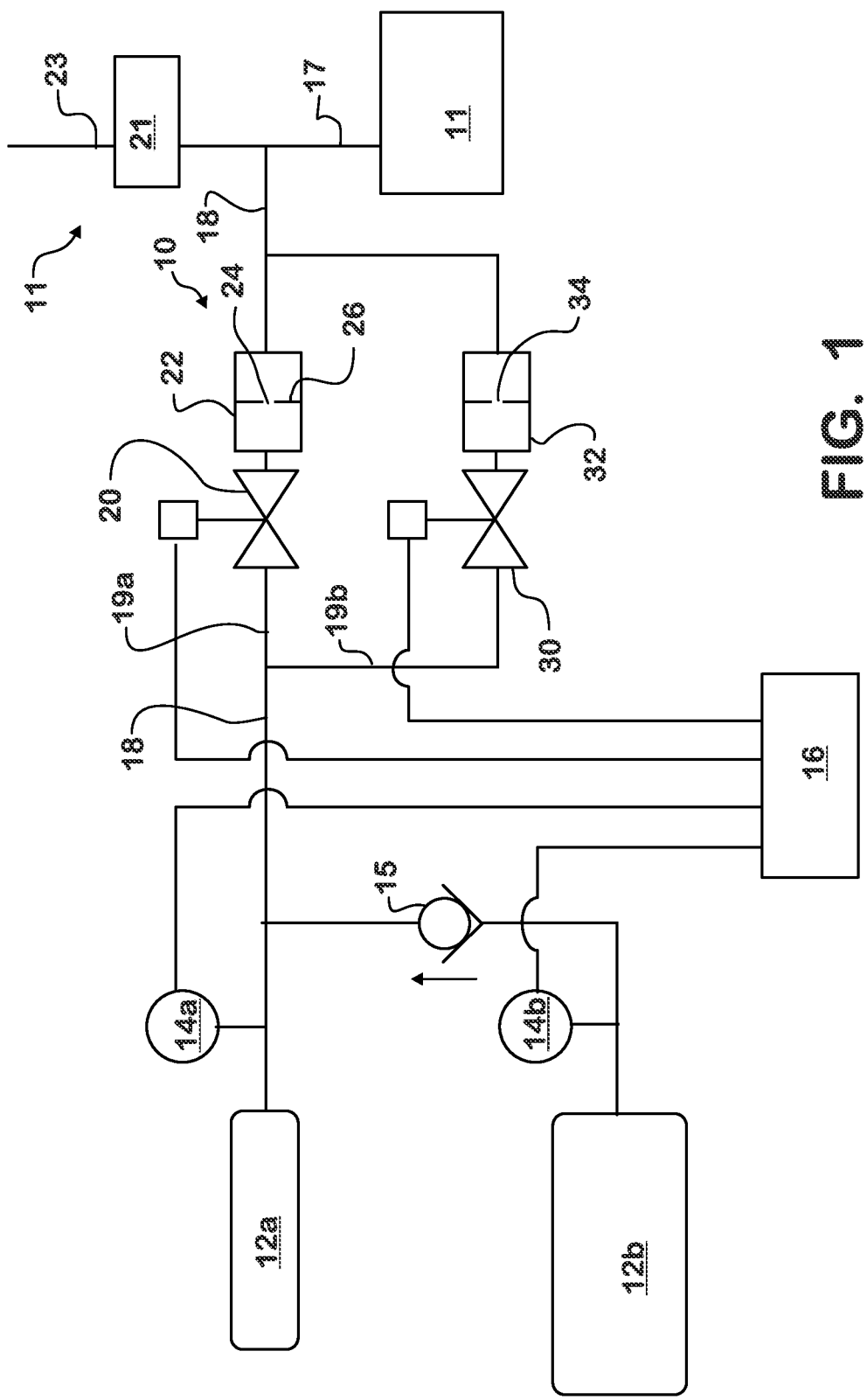
FIG. 1 illustrates a flow manifold system that includes one or more critical flow orifices for controlling the volumetric flow of a first gas that is injected into the flow of a second gas.

FIG. 1 illustrates a flow manifold system 10 that includes one or more critical flow orifices 12a, 12b for controlling the volumetric flow of a first gas that is injected into the flow of a second gas, such as, for example, the exhaust gas(es) of an engine 11. According to certain embodiments, the flow manifold system 10 may include a start-up cartridge 12a and a main cartridge 12b that hold or store the first gas. The first gas may be a plurality of different gases or combinations of gases, including, for example, gaseous $NH_3$, among others. According to such embodiments, the cartridges 12a, 12b may include an ammonia storage material, such as, for example, an adsorptive or absorptive solid storage medium, such as metal amine salts, among others.

The start-up cartridge 12a may be relatively small compared to the main cartridge 12b to facilitate rapid start-up of the flow manifold system 10. Moreover, the flow manifold system 10 may include heating units (not shown), such as electrical heaters, that may be placed inside the cartridges 12a, 12b, and which may be used to heat the cartridges 12a, 12b to facilitate the flow of the first gas out of the cartridges 12a. For example, according to embodiments in which the first gas is $NH_3$, the heaters may facility the release of gaseous $NH_3$ from the ammonia storage material and the subsequent flow of the $NH_3$ out of the cartridge 12a, 12b. While the smaller size of the start-up cartridge 12a may equate to the start-up cartridge 12a storing less first gas, such as $NH_3$, than the main cartridge 12b, the start-up cartridge 12a may attain elevated temperatures at which the first gas is released from the cartridge 12a faster than the larger main cartridge 12b. Thus, during at least initial operation of the engine 11, the supply of the first gas to the flow manifold system 10 may be provided by the start-up cartridge 12a. However, once the main cartridge 12b is heated to temperatures used for providing the first gas to the flow manifold system 10, the heating unit used to elevate the temperature of the start-up cartridge 12a may be deactivated. Such deactivation of the heating unit of the start-up cartridge 12a may be employed to prevent premature depletion of the first gas in the start-up cartridge 12a. The activation and deactivation of the heating units of the cartridges 12a, 12b may be controlled by an ECU 16.

The flow manifold system 10 also includes pressure sensors 14a, 14b that monitor the pressure in the start-up and main cartridges 14a, 14b respectively. The pressure sensors 14a, 14b may produce signals that may be sent to the ECU 16 that are indicative of the sensed pressures of the first gases that are delivered from the cartridges 12a, 12b, respectively. According to certain embodiments, such signals may provide information to the ECU 16 that the ECU 16 uses to operate the heating units of the cartridges 12a, 12b. Moreover, such information may indicate when the heating units of the cartridges 12a, 12b should be activated and/or deactivation. According to certain embodiments, the flow manifold system 10 may attempt to maintain a constant pressure of first gases being supplied from either or both of the cartridges 12a, 12b, as sensed by one or more of the pressure sensors 14a, 14b, by modulating the heating units between activated and deactivated conditions.

The flow manifold system 10 may also include a check valve 15 that prevents the back flow of the first gases. For example, according to the embodiment illustrated in FIG. 1, the flow manifold system 10 includes a check valve 15, such as a backflow valve, positioned upstream of the main cartridge 12b that prevents first gas, such as gaseous $NH_3$, from the start-up cartridge 12a and/or the main cartridge 12b from flowing back toward the main cartridge 12b.

The first gas released by the cartridges 12a, 12b may flow along a supply line 18 to a first valve 20. In the illustrated embodiment, the first valve 20 may be a Boolean control valve. Moreover, the first valve 20 may be operated between "on" and "off" positions. When the first valve 20 is in an "on" position, at least a portion of the first gas released from either or both cartridges 12a, 12b that in the downstream of the first valve 20 may be allowed to flow through the first valve 20. Conversely, when in an "off" position, the first gas may not be allowed to flow through the first valve 20.

When the first valve 20 is in an "on" position, first gas that has flowed through the first valve 20 may be allowed to flow to a first critical flow apparatus 22. The first critical flow apparatus 22 includes a critical flow orifice 24, as shown in FIG. 2. According to certain embodiments, the critical flow orifice 24 may be positioned in a first restriction plate 26. Additionally, according to certain embodiments, the restriction plate 26 may be in the supply line 18, first valve 20, and/or housed in a separate housing 28. Further, the critical flow orifice 24 may have a constant or an adjustable size and/or shape, such as, for example, having a constant or variable diameter.

The critical flow orifice 24 is positioned to provide a flow restriction in the flow path of the first gas. Such a restriction will both increase the velocity and decrease the pressure of the first gas that is flowing through the critical flow orifice 24. Moreover, such restriction may result in the pressure (P1) upstream of the critical flow orifice 24 being higher than the pressure (P2) downstream of the critical flow orifice 24.

The flow manifold system 10 may be configured for the differences between the pressures upstream and downstream of the critical flow orifice 24 to allow the first gas to reach its maximum velocity or critical flow when passing through the critical flow orifice 24. When the first gas reaches its maximum velocity, further decreases in P2, and moreover increases in the differences between P1 and P2, will not alter amount of first gas that is flowing through the critical flow orifice 24. Instead, the volumetric flow of the first gas through the critical flow orifice 24 is generally defined by pressure and the size of the critical flow orifice 24. Thus, when the first gas attains its maximum velocity through the critical flow orifice 24, a constant quantity of first gas may flow through the critical flow orifice 24. Knowing that a constant quantity of first gas will be flowing through the critical flow orifice 24 allows for a determination of the quantity of first gas being delivered by the flow manifold system 10 to the second gas, such as the exhaust gas, that is downstream of the critical flow orifice 24. Moreover, such a system allows for an accurate determination of the quantity of first gas that is being supplied by the flow manifold system 10 to the second gas without the need or use of a flow sensor and its associated components.

For example, in embodiments in which the first gas is gaseous $NH_3$, the first gas may attain its critical flow when the ratio of P1 to P2 is approximately 1.73. The pressure ratio for various gases to reach their critical flow however may depend on a variety of factors, including the properties and temperatures of the gas(es). However, in an effort to ensure critical flow is attained, the flow manifold system 10 may be designed for the P1/P2 ratio to be higher than that needed for obtaining critical flow, such as the ratio of P1 to P2 for gaseous $NH_3$ being around 2. At this condition, the volumetric flow is constant and thus not variable with pressure drop across the critical flow orifice 24. Therefore, as the volumetric flow of first gas through the critical flow orifice 24 may be constant, the quantity of first gas that the flow manifold system 10 delivers and/or injects into the second gas may be constant.

During use, the flow manifold system 10 may be configured to allow the first valve 20 to control or adjust the amount of first gas supplied by the flow manifold system 10 to the second gas. For example, the first valve 20 may operate at different duty cycles, where the duration that the first valve is in the "on" and "off" positions is pulsed or altered. Control of the first valve 20 through the use of duty cycles may allow the flow manifold system 10 to adapt to different engine 11 operating conditions. For example, according to certain embodiments in which the second gas is the exhaust gas of the engine 11, the temperature of the second gas may initially be relatively low, such as during cold-start conditions. During such conditions, the flow manifold system 10 may provide a smaller quantity of first gas to the second gas than when the second gas attains higher temperatures. In such situations, the first valve 20 may operate at a reduced duty cycle, where the first valve 20 may be in the "on" position for a shorter duration than when the second gas is at higher and/or normal operating temperatures. For example, if the flow manifold system 10 is to operate at a 25% duty cycle, the first valve 20 may spend approximately 25% of a predetermined duration of time, such as, for example, one second, in the "on" position and 75% of the remainder of the time in the "off" position. According to certain embodiments, the positioning of the first valve 20, such as whether the first valve 20 is to be in the "on" or "off" position, may be controlled by the ECU 16. Moreover, the ECU 16 may be configured to determine when the first valve 20 should be in the "on" or "off" positions or the duty cycle of the valve 20, based on, for example information provided to, stored in, and/or retrievable by the ECU 16.

After passing through the critical flow orifice 24, the first gas may continue flowing along a portion of the supply line 18 until the first gas reaches an exhaust line 17 that contains the second gas, where the first gas may be injected into the second gas. According to certain embodiments in which the second gas is exhaust gas generated by an engine 11, the first and second gases in the exhaust line 17 may be delivered to other components of an exhaust gas after-treatment system 11, such as an SCR 21, before flowing out of the exhaust gas after-treatment system 11, such as, for example, through a tailpipe 23.

According to certain embodiments, the flow manifold system 10 may include more than one valve 20 and critical flow apparatus 22 and/or critical flow orifice 24. For example, FIG. 1 illustrates a second valve 30 and second critical flow apparatus 32 having a critical flow orifice 34 arranged in parallel to the first valve 20 and associated critical flow apparatus 22 and/or critical flow orifice 24. Thus, first gas being supplied along the supply line 18 may either flow along a first portion 19a of the supply line 18 to the first valve 20 or flow along a second portion 19b of the supply line to the second valve 20. According to certain embodiments, the second portion 19a of the supply line 18 may then terminate at the first portion 19a of the supply line 18, or vice versa, so that the first gas, if any, flowing through the second valve 20 and associated critical flow orifice 34 may join with first gases, if any, flowing through the first valve 20 and associated critical flow orifice 24. Alternatively, according to other embodiments, the first portion 19a and second portion 19b of the supply line 18 may separately be configured to separately deliver first gas, if any, to the second gas.

The inclusion of more than one valve 20, 30 and associated critical flow orifices 24, 34 may allow for improved precision at to the quantity of first gas being injected into the second gas through the flow manifold system 10. For example, the critical flow orifice 24 associated with the first valve 20 may have a different size and/or operate at a different pressure than the critical flow orifice 30 associated with the second valve 20. Such differences in sizes and/or pressures may result in difference in the quantity of first gas that flows through the critical flow orifices 24, 34 when the first gas is at its critical flow. Thus, each critical flow orifice 24, 34 may be used by the flow manifold system 10 to inject, either alone or together, different amounts first gas into the second gas. And again, as the critical flow orifices 24, 34 allow, when the first gas is flowing at their critical flow, for a constant and known amount of first gas to flow through the critical flow orifices 24, 34, the flow manifold system 10, the flow manifold system 10 may have an accurate indication of the actual quantity of first gas delivered by the flow manifold system 10 for injection into the second gas. The accuracy as to the quantity of first gas delivered for injection using critical flow orifices 24, 34 may be further enhanced through the duty cycled or modulated operation of the valves 20, 30, as previously discussed.

The invention claimed is:

1. A system for determining a quantity of a dosed gas, the system comprising:
   at least one supply cartridge configured to store the gas:
   a passageway in fluid communication with the at least one supply cartridge through which the gas is supplied from the supply cartridge;
   a control valve disposed in the passageway and alternately moveable between a fully open position in which the control valve does not block flow of the gas and a fully closed position in which the control valve fully blocks flow of the gas:
   a critical flow orifice disposed in the passageway configured such that when the gas attains its maximum velocity through the critical flow orifice a constant quantity of the gas flows through the critical flow orifice regardless of pressure variations across the critical flow orifice;
   a control unit in communication with the control valve and configured to estimate the quantity of the gas dosed based on the constant quantity and a duration of time that the control valve is in its open position.

2. The system of claim 1, wherein the dosed gas is gaseous ammonia.

3. The system of claim 1, wherein the engine control unit is configured to operate the control valve between the fully open and fully closed positions to dose a predetermined quantity of the gas.

4. The system of claim 3, wherein the control unit is configured to operate the control valve at a plurality of different duty cycles, each of the plurality of duty cycles adjusting the duration of time that the control valve remains at its fully open position.

5. The manifold system of claim 1, wherein the critical flow orifice is housed in the control valve.

6. The system of claim 1, further including a check valve disposed in the fluid passageway and configured to prevent the backflow of gas through the fluid passageway.

7. An exhaust gas after-treatment system for injecting an ammonia gas into an exhaust gas of an engine for the treatment of nitrogen oxides, the after-treatment system comprising:
   a supply cartridge configured to store the ammonia gas;
   a first control valve configured to receive at least a portion of a flow of the ammonia gas from the supply cartridge, the first control valve configured to control the flow of ammonia gas to a first critical flow orifice, the first critical flow orifice configured to allow for a relatively constant volumetric flow of the ammonia gas to be injected into the exhaust gas when the ammonia gas flowing through the first critical flow orifice attains a first critical flow;
   a second control valve configured to receive at least a portion of the flow of the ammonia gas from the supply cartridge, the second control valve configured to control the flow of ammonia gas to a second critical flow orifice, the second critical flow orifice configured to allow for a relatively constant volumetric flow of the ammonia gas to be injected into the exhaust gas when the ammonia gas flowing through the second critical flow orifice attains a second critical flow; wherein:

the relatively constant volumetric flow of ammonia gas that flows through the first critical flow orifice is different than the relatively constant volumetric flow of ammonia gas that flows through the second critical flow orifice and an engine control unit configured to estimate a quantity of the ammonia gas supplied to the exhaust gas based on a duration of time that the first valve allows the ammonia gas to flow to the first critical flow orifice, the estimation of the ammonia gas supplied to the exhaust gas not being based on information provided by a flow sensor.

* * * * *